United States Patent
Koch et al.

(10) Patent No.: US 8,400,512 B2
(45) Date of Patent: Mar. 19, 2013

(54) CAMERA ASSISTED SENSOR IMAGING SYSTEM FOR DERIVING RADIATION INTENSITY INFORMATION AND ORIENTATION INFORMATION

(75) Inventors: Stefan Koch, Oppenweiler (DE); Marc Guthoerl, Delmenhorst (DE)

(73) Assignee: Sony Corporation, Tokyo (JP)

( * ) Notice: Subject to any disclaimer, the term of this patent is extended or adjusted under 35 U.S.C. 154(b) by 645 days.

(21) Appl. No.: 12/635,016

(22) Filed: Dec. 10, 2009

(65) Prior Publication Data

US 2010/0182434 A1 Jul. 22, 2010

(30) Foreign Application Priority Data

Dec. 30, 2008 (EP) .................................... 08173088

(51) Int. Cl.
*H04N 5/33* (2006.01)

(52) U.S. Cl. ................. 348/164; 348/E5.09; 348/E5.092

(58) Field of Classification Search .................. 348/164, 348/E5.09–E5.092
See application file for complete search history.

(56) References Cited

U.S. PATENT DOCUMENTS

| | | | |
|---|---|---|---|
| 6,353,224 B1 | 3/2002 | Sinclair et al. | |
| 6,791,531 B1* | 9/2004 | Johnston et al. | 345/157 |
| 7,764,324 B2* | 7/2010 | Andonian et al. | 348/E5.09 |
| 8,154,605 B2* | 4/2012 | Muramatsu | 348/208.14 |
| 2005/0093733 A1 | 5/2005 | Lovberg et al. | |
| 2006/0274149 A1 | 12/2006 | Yoshizawa | |
| 2007/0206849 A1 | 9/2007 | Sakata et al. | |
| 2007/0299596 A1* | 12/2007 | Moritz et al. | 701/117 |
| 2011/0169943 A1* | 7/2011 | Bachman et al. | 348/117 |

FOREIGN PATENT DOCUMENTS

| | | |
|---|---|---|
| JP | 2008-241304 | 10/2008 |
| KR | 1020070091061 A | 9/2007 |
| WO | WO 2007/027827 A2 | 3/2007 |

OTHER PUBLICATIONS

Hugh D. Griffiths, et al., "Radar Imaging for Combatting Terrorism", 19 pages.
"THz Imaging" Chapter 3, pp. 29-75.

* cited by examiner

*Primary Examiner* — Bharat N Barot
(74) *Attorney, Agent, or Firm* — Oblon, Spivak, McClelland, Maier & Neustadt, L.L.P.

(57) ABSTRACT

The present invention relates to the fields of imaging systems, security screenings, contraband object detection, microwave screening, millimeter wave screening and Terahertz screening. The present invention especially relates to a camera assisted sensor imaging system and a multi aspect imaging system.

The camera assisted sensor imaging system according to the present invention comprises an optical and/or infrared camera unit for generating camera image information, a processing and control unit for detecting targets based on the generated camera image information, and a sensor unit adapted to successively scan portions of a detected target and to generate a plurality of corresponding image information parts, whereby the sensor unit is operable in the microwave, millimeter wave and/or Terahertz frequency range, and the processing and control unit is further adapted to construct an image of the target based on the image information parts and based on the generated camera image information.

The multi aspect imaging system according to the present invention comprises one or more reflective elements and a sensor section operable in the microwave, millimeter wave and/or Terahertz frequency range. The sensor section is adapted to scan a first and a second aspect of a target, whereby the second aspect is scanned via a reflective element and the second aspect is scanned directly or via another reflective element.

14 Claims, 5 Drawing Sheets

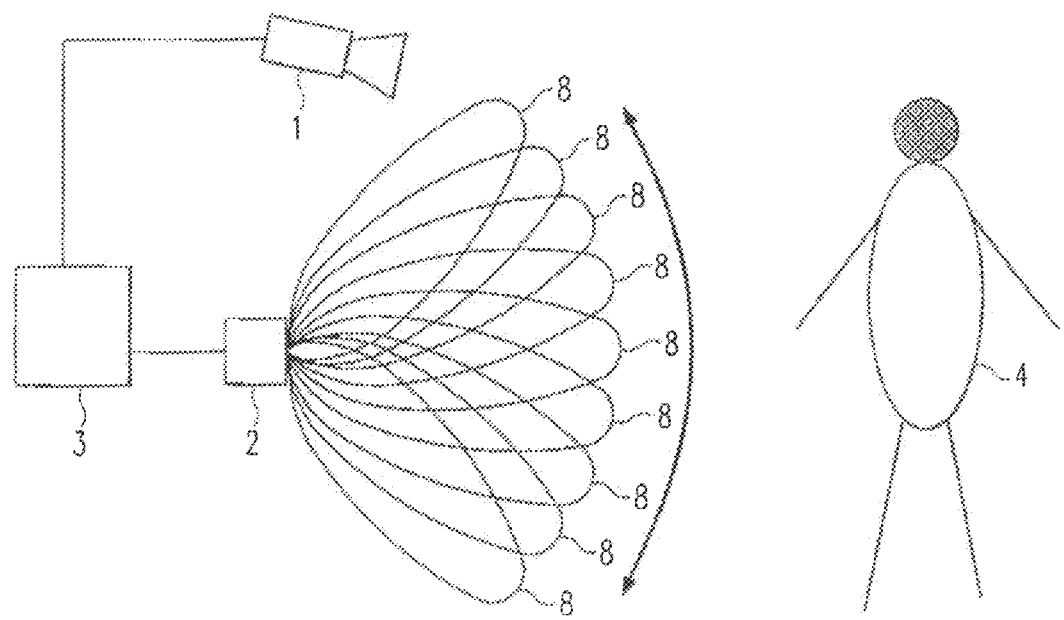
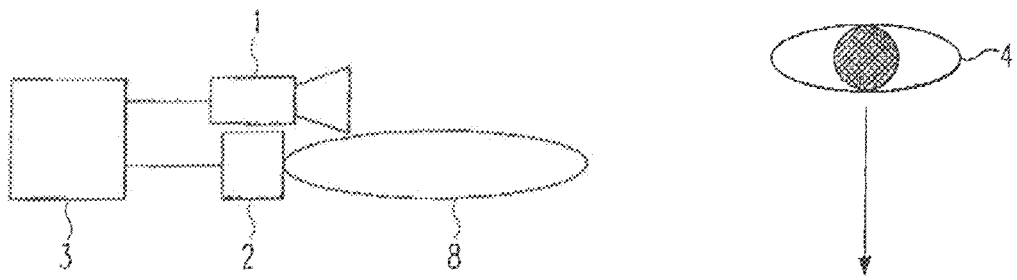
Fig. 1
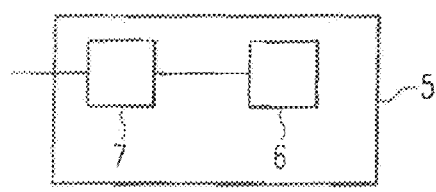
Fig. 2

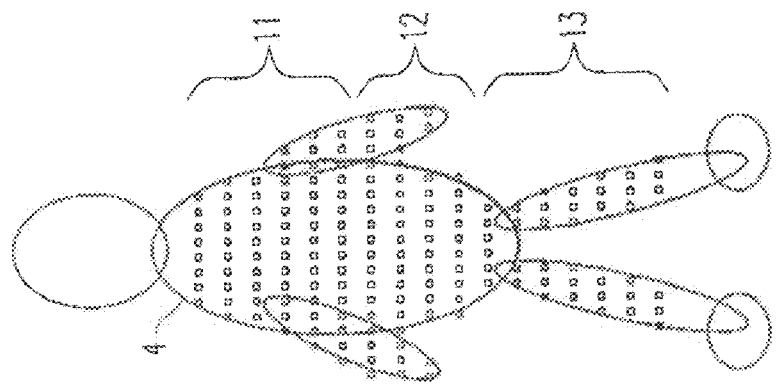
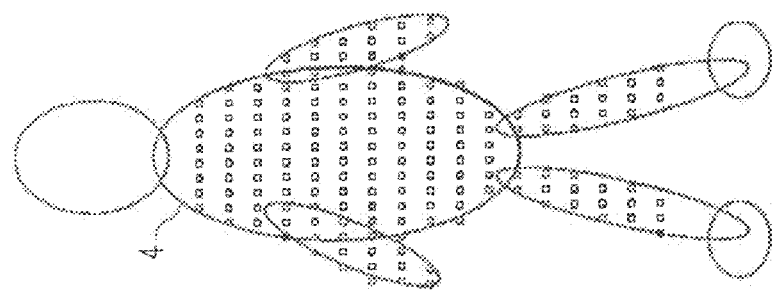
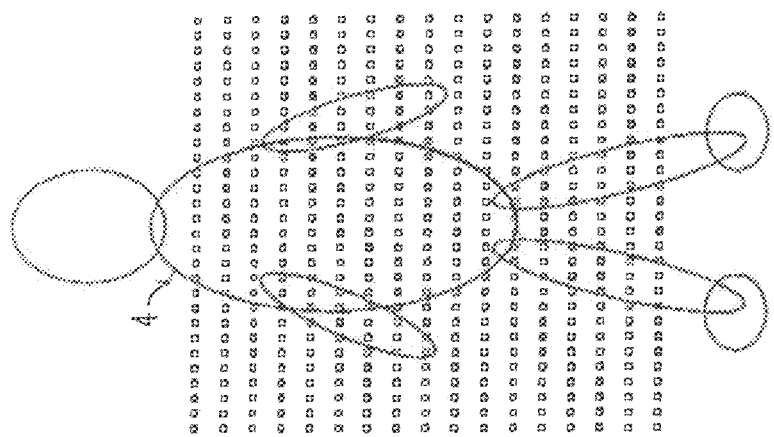

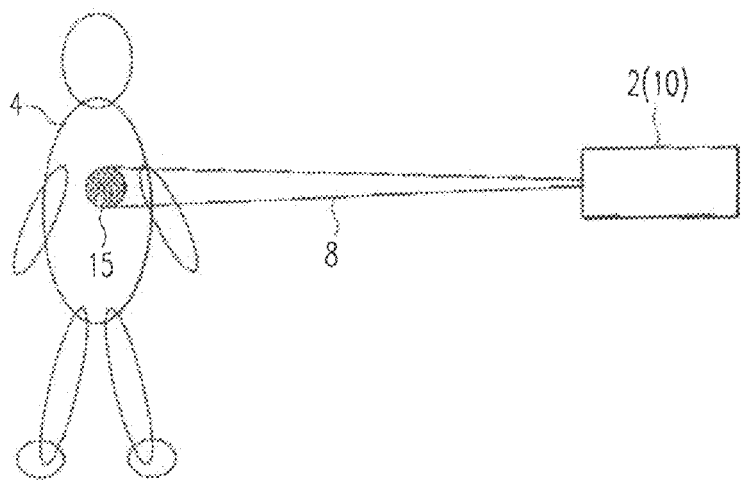
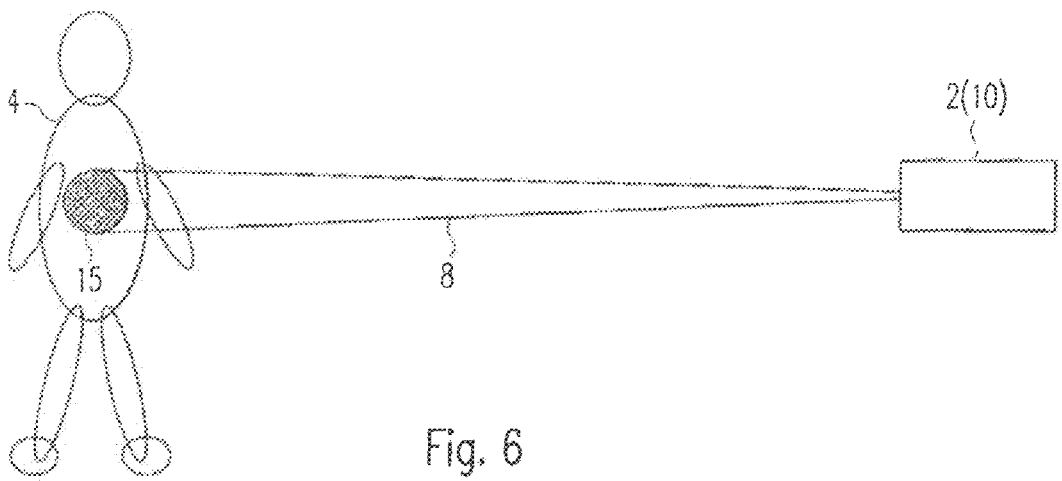
Fig. 6

CAMERA ASSISTED SENSOR IMAGING SYSTEM FOR DERIVING RADIATION INTENSITY INFORMATION AND ORIENTATION INFORMATION

FIELD OF THE PRESENT INVENTION

The present invention relates to the fields of radiometric imaging systems, security screenings, contraband object detection, microwave screening, millimeter wave screening and Terahertz screening. The present invention especially relates to a camera assisted sensor imaging system and a multi aspect imaging system operable in the microwave, millimeter wave and/or Terahertz frequency range.

DESCRIPTION OF THE PRIOR ART

Sensor imaging systems are known to be applied in a wide range of applications including for example medical, industrial (e.g. quality control) and security/surveillance related applications.

The type of sensors employed for sensing an image depends upon the application. Examples of sensors include microwave sensors and x-ray sensors. The wavelengths ranging from of 1000 mm to 1 mm are commonly referred to as microwaves. Other definitions cite 300 mm for the upper bound of the microwave spectrum and 10 mm for the lower bound. Electromagnetic radiation in the range from 100 mm to 10 mm is commonly referred to as centimeter waves and radiation in the range from 10 mm to 1 mm is commonly referred to as millimeter waves. Submillimeter waves are commonly seen as ranging from 1 mm to 0.1 mm, but may also comprise still smaller wavelengths from the far infrared. Submillimeter waves are also referred to as Terahertz radiation. The smaller the wavelength, the higher is the attainable resolution. Microwaves, millimeter waves and submillimeter waves penetrate e.g. clothes any may be used to detect objects carried by human beings under the clothes.

Active and passive sensors do exist. Active sensors do emit electromagnetic radiation towards an object and sense (receive) the electromagnetic radiation passing through the object or reflected back from the object. Microwave, millimeter wave and Terahertz sensors belong to the latter case, where the reflected radiation is detected. Eventually, the object may interact with the emitted radiation by other mechanisms than pure reflection and thereby may, for example, transform, modulate, attenuate, etc. the radiation or change its frequency. The notion "reflected radiation" is used to refer to all this response radiation emitted/reflected/generated by the object. Active sensors in the microwave spectrum are commonly referred to as radar sensors. Passive sensors do sense the electromagnetic radiation emitted from an object without generating and transmitting electromagnetic radiation to the object. An example of a passive sensor is a sensor sensing millimeter wave and/or submillimeter wave emitted by an object according to Planck's law (black body radiation) as are recently used in security screening devices at airports or other venues requiring for checking for contraband objects such as weapons, liquids, bombs, knifes, metal etc. carried under clothes or in another way that they can't be seen by a human eye.

In order to obtain an image of an object, sensing devices (scanners) must scan a two dimensional field of view. To achieve this, large, complex and expensive two dimensional (e.g. microwave) sensor arrays were developed. Such sensors are commonly found in military applications. A two dimensional sensor array itself does not provide for images corresponding to a plurality of aspects (views) of a scanned target. This has for example the disadvantages that objects carried by a human on the side averted from the sensor array can not be detected or that stereoscopic images are not obtainable. Typically more often found in medical or security related applications are less complex sensors which only have a zero or one dimensional field of view and which are mechanically moved around or along a target. In this case, a large and cumbersome mechanical assembly is needed for providing the sensor movement and the target (e.g. a human) is required to stand still during scanning. This solution is inconvenient and does not provide for a scanning which may be performed unperceived by a human that is scanned. It is also expensive due to the mechanical assembly required and can not be applied to a region where a high number of people have to be scanned. The technique however is adapted to provide for images corresponding to a plurality of aspects of the target. Further, a technique providing for multiple aspects of the target is known in which the person is rotated instead of the sensor. The drawbacks of this technique are the same as for the rotating sensor technique.

BRIEF DESCRIPTION OF THE PRESENT INVENTION

It is an object of the present invention to overcome at least some of the above cited disadvantages of the prior art and to provide for an inexpensive sensing system adapted to obtain an image of an object and to provide for an inexpensive sensing system adapted to generate sensor information corresponding to a plurality of aspects of an object. This object is solved by a camera assisted sensor imaging system according to the present invention and a multi aspect imaging system according to the present invention.

The camera assisted sensor imaging system according to the present invention comprises an optical and/or infrared camera unit for generating camera image information, a processing and control unit for detecting targets based on the generated camera image information, and a sensor unit adapted to successively scan portions of a detected target and to generate a plurality of corresponding image information parts, whereby the sensor unit is operable in the microwave, millimeter wave and/or Terahertz frequency range and the processing and control unit is further adapted to construct an image of the target based on the image information parts and based on the generated camera image information.

Advantageously, the processing and control unit is adapted to define the portions of the detected target based on the generated camera image information and to control the sensor unit to successively scan the defined portions. Hereby, the camera assisted sensor imaging system advantageously further comprises a memory for storing information indicating which portion of the target have been scanned, whereby the definition of the portions is based on the stored information.

Advantageously, the processing and control unit is adapted to determine a motion or movement of the target and wherein the controlling of the sensor and/or the construction of the image is based on the determined motion or movement.

Advantageously, the sensor unit comprises a line sensor adapted to scan a one dimensional field of view and generate a corresponding portion of line image information.

The line sensor advantageously provides a plurality of electronically selectable antenna beam directions from which the one dimensional field of view is constructed.

Advantageously, the line sensor or a mirror covering the field of view of the line sensor is rotatably mounted in the sensor unit so that a two dimensional field of view is provided by the sensor unit.

Advantageously, the construction of the image comprises arranging the image information parts or data derived therefrom in a two dimensional abstract space based on the generated camera image information.

Advantageously, the image corresponds to electromagnetic radiation emitted or reflected by the target and received by the sensor unit.

Advantageously, the processing and control unit is adapted to determine one or more distances to the target, whereby the construction of the image is based on the determined one or more distance.

Advantageously, the processing and control unit is adapted to control the sensor unit so as to rescan a region of a detected target in case the target comes closer to the sensor unit and/or an interest of an improved image of the region exist. Hereby, such a rescan can e.g. be done with the same resolution. Alternatively, such a rescan can be done with a higher resolution, e.g. by decreasing the step size of the antenna scan (for example in case an interest of an improved image in the region exists).

Advantageously, the camera assisted sensor imaging system further comprises one or more reflective elements, whereby the sensor unit is adapted to successively scan second portions of the detected target and to generate a plurality of corresponding second image information parts, the sensor unit is adapted to scan the second portions via a reflective element and to scan the first portions directly or via another reflective element, the first image information parts corresponding to a first aspect of the target, the second image information parts corresponding to a second aspect of the target and whereby either the construction of the image is further based on the second image information parts or the processing and control section is adapted to construct a second image of the target based on the second image information parts and based on the generated image information.

The multi aspect imaging system according to the present invention comprises one or more reflective elements and a sensor section operable in the microwave, millimeter wave and/or Terahertz frequency range. The sensor section is adapted to scan a first and a second aspect of a target, whereby the second aspect is scanned via a reflective element and the second aspect is scanned directly or via another reflective element.

BRIEF DESCRIPTION OF THE DRAWINGS

FIG. 1 shows a schematic representation of a first embodiment of the camera assisted imaging system according to the present invention in a front view and in a top view.

FIG. 2 shows a schematic representation of a sensor unit of the first embodiment.

FIG. 5A illustrates a scanning technique according to the prior art.

FIG. 5B illustrates a scanning technique according to the present invention.

FIG. 5C illustrates a scanning technique according to the present invention.

FIG. 6 illustrates a variation of spot size (pixel size) with distance.

DESCRIPTION OF THE PREFERRED EMBODIMENTS

Figure 3:
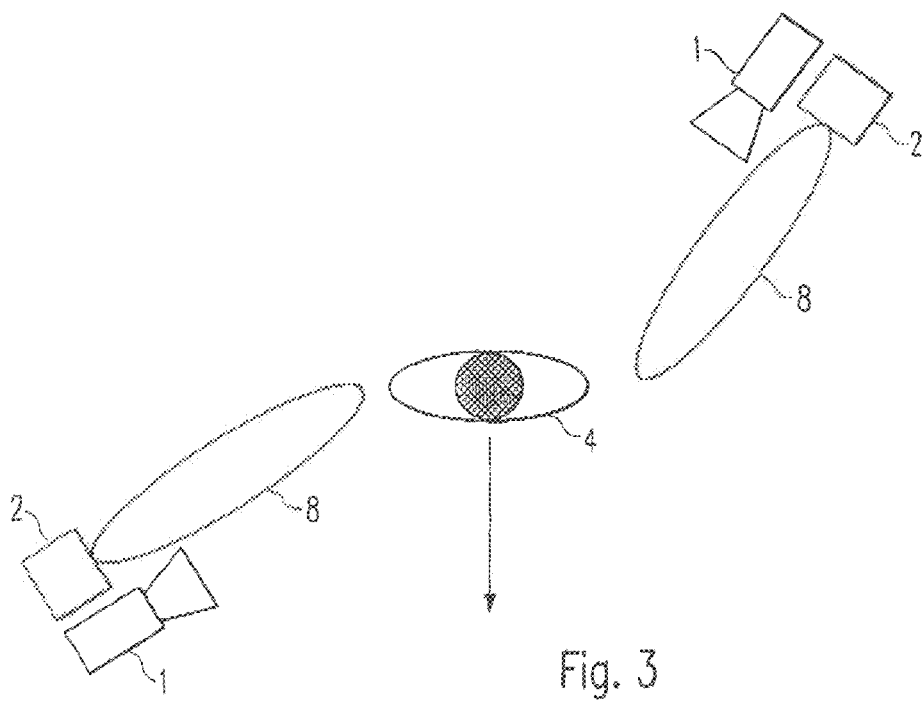
FIG. 3 shows an enhanced camera and sensor configuration for the first embodiment which provides for a two-sided scan of a target.

The basic idea of the camera assisted sensor imaging system is to synchronize (in a spatial sense) a camera with a sensor so that a sensor image can be composed from small sensor "images" (pixels or groups of pixels) based on information generated by the camera.

FIG. 1 shows a schematic front view and a schematic top view of a first embodiment of the camera assisted sensor imaging system according to the present invention. The imaging system comprises a camera 1, a sensor unit 2 and a processing and control unit 3. The system may, for example, be a surveillance system used for performing a security screening in order to detect contraband objects. Other applications are possible however.

The camera 1 generates image information of a region of observation. The camera image information generated is of video type ('video' is used in the sense opposing 'still image'). The camera 1 may be an optical or an infrared (IR) camera or may operate in both wavelength ranges.

The processing and control unit 3 provides an image recognition and tracking capability and may be implemented in hardware and/or software. Based on the camera image information, the processing and control unit 3 detects targets 4. Targets 4 may be human beings, animals and non living objects. What type of entities will be detected as a target (that is later on scanned by the sensor unit 2) may depend on the type of sensor used in the sensor unit 2 and the type of application. Shown in FIG. 1 is a human being as a target 4. The processing and control unit 3 is configured to not detect any background (e.g. walls, ceiling, ground, furniture, fixed machinery) as a target.

The sensor unit 2 comprises a line sensor 5 adapted to scan a one dimensional (1D) field of view ("a line") and to generate a corresponding line image information. The 1D field of view is composed of zero dimensional field of views 8, each zero dimensional field of view 8 corresponding to a pixel. The line sensor might 5 scan the pixels simultaneously or pixel after pixel. FIG. 1 shows an arrangement wherein the scanned 1D field of view is arranged vertically ("vertical line scanning"). The sensor unit 2 (line sensor 5) is operable in the microwave, millimeter wave and/or Terahertz frequency range.

Frequency sweeping might be used to provide the line sensor 5. FIG. 2 shows a frequency sweeping line sensor 5 comprising an antenna element 6 and a variable frequency circuit 7. In case of a passive sensor, the variable frequency circuit 7 might be a pure receiver circuit comprising a variable frequency downconversion section. In case of an active sensor, the variable frequency circuit 7 might be a receiver and transmitter circuit comprising a variable frequency downconversion section and a variable frequency upconversion section. The antenna element 6 has a different direction of emission and reception (zero dimensional field of view) depending on the frequency. By varying the reception frequency and, eventually, the transmission frequency of the variable frequency unit 7, the different pixels can be addressed and corresponding pixel image data can be obtained. It is noted that in case of an active sensor, generally, a radiation emitting part (e.g. antenna) and a radiation reception part (e.g. antenna) neither need to be the same element nor need to be located at approximately the same location. For the present embodiment, this means that the antenna element 6 might be a distributed element and the variable frequency circuit 7 might be a distributed element.

When the target 4 passes by the sensor unit 2 crossing its one dimensional field of view, the sensor unit 2 (line sensor 5) repeatedly scans lines and generates corresponding sensor information (line image information). Based on the camera image information, the processing and control section 3 constructs a sensor image from the sensor information generated by the sensor unit 2. Eventually, the processing and control unit 3 knows about the characteristics and the performance/operation of the sensor unit 2 (e.g. knows the antenna radiation pattern, antenna beam direction/antenna steering angle). The camera image information assists in the construction of the two dimensional sensor image from the plurality of zero dimensional image information parts (individual pixels) and/or one dimensional image information parts (e.g. line image information) provided by the sensor unit 2. For example, the two dimensional (2D) image is composed out of various measured one dimensional (1D) line scans.

Based on the camera image information, the image information parts (sensor pixel values or groups of sensor pixel values) are arranged in two dimensions to form a two dimensional image. When groups of sensor pixel values are arranged, only the groups—and not the pixels within a group—are arranged in relation to each other based on the camera image information. Whether individual pixels or groups of pixels are arranged, inter alia depends on the type of sensor employed, the sensor's speed of information acquisition, the speed of the target 4 and the desired image accuracy. Eventually, not the sensor pixel values or groups of sensor pixel values themselves are arranged to form the two dimensional value but some data derived from the sensor pixel values or groups of sensor pixel values. From the camera image information, data is derived which indicates which sensor image information part (or derived sensor image information) corresponds to which part of the target. Using this data, the two dimensional sensor image is constructed from the sensor information. Thus, radiation intensity information is derived from the sensor data and (absolute and/or relative) location/orientation information is—at least partly—derived from the camera image information. The constructed image is a sensor image in the sense that the image represents the electromagnetic radiation emitted or reflected by the target 4 and received by the sensor unit 2.

The processing and control section 3 has a tracking capability allowing it to track moving targets. The processing and control section 3 determines the movement or motion of the target including translations and rotations of the target and/or translations and rotations of (at least some of) the target's components. For example, the processing and control section 3 determines body motions of a human target 4. By determining the translations and rotations of the target's components, an arbitrary motion of the target is captured. For example, a torso of a passing by human 4 might substantially perform a translational movement, whereby arms (upperarm, underarm, hand) and legs (thighs, lower leg, foot) might perform more complex movements comprising translations and rotations. The determined motion or movement can internally be represented in any way. In the following, movement or motion of the target is understood to comprise the internal movement or motion (i.e. the movement or motion of the components) of the target 4. The processing and control section 3 constructs an image of the target 4 from the sensor information based on the determined movement or motion of the target.

The processing and control section 3 may be adapted to detect specific objects (e.g. arms, metal, plastic, knives, liquids, explosives etc.) based on the generated sensor image and to generate an alarm in case a specific object is detected.

FIG. 3 shows an arrangement where a further sensor group of a camera 1' and sensor unit 2' are provided. The camera 1' and the sensor unit 2' operate the same way as the camera 1 and the sensor unit 2 and are connected to the processing and control section 3. The processing and control section 3 operates in relation to the camera 1' and the sensor unit 2' in the same way as in relation to the camera 1 and the sensor unit 2. The sensor units 2, 2' are arranged such that the field of views of the sensor units 2, 2' are substantially facing each other. Thus, the target is scanned from two opposing sides and the processing and control unit 3 generates two images of the target 4. One image corresponds to a first aspect of the target 4, the other corresponds to another aspect (here: the opposite aspect) of the target. The sensor groups may for example be located to the left and the right of a passageway. In an alternative embodiment, the second sensor group is replaced by one or more reflective elements. The camera 1 and sensor unit 2 view the first aspect of the target 4 directly and the second aspect of the target via the one or more reflective elements.

Figure 4:
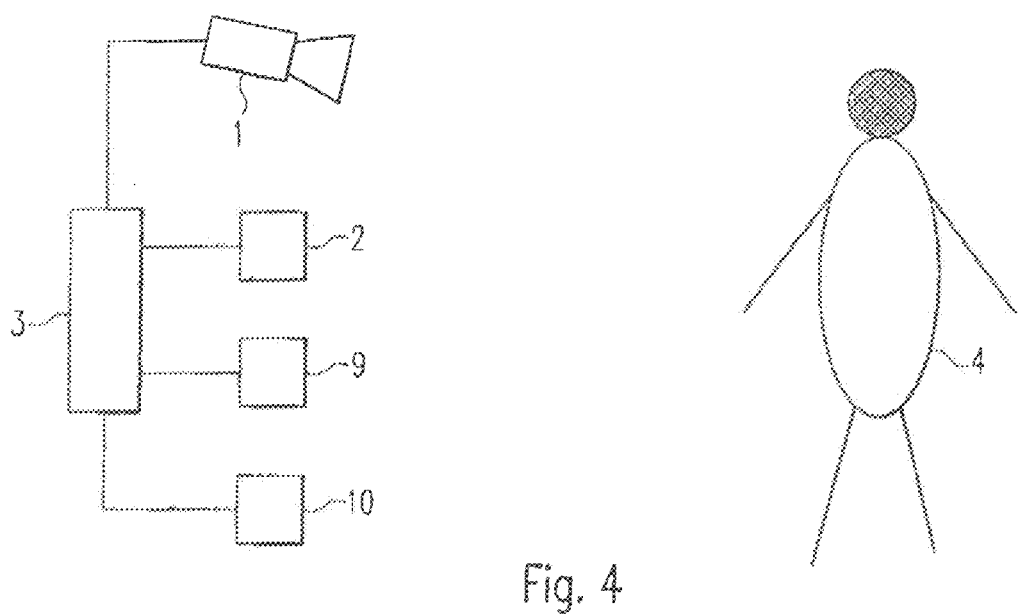
FIG. 4 shows a schematic representation of a second embodiment of the camera assisted imaging system according to the present invention.

A second embodiment of the camera assisted sensor imaging system according to the present invention will now be explained in which the imaging system is adapted to generate a two dimensional image of the target without the requirement that the target 4 is moving. Nevertheless, the target 4 may be allowed to move. FIG. 4 shows a schematic representation of the embodiment.

The camera assisted sensor imaging system of the second embodiment comprises a camera 1 as described above and a processing and control unit 3 adapted to evaluate the camera image data as described above. The system further comprises a sensor unit 2 operable in the microwave, millimeter wave and/or Terahertz frequency range. The sensor unit 2 of the second embodiment provides additional functionality to the functionality of the sensor unit 2 of the first embodiment described above, since the sensor unit 2 of the second embodiment is adapted to scan a two dimensional field of view. The two dimensional field of view may be provided by means of successively scanning a plurality one or zero dimensional field of views (i.e. different parts of the two dimensional field of view are scanned at different time) or by scanning the entire two dimensional field of view at the same time.

In the second embodiment, the camera image information is used by the processing and control unit 3 for defining portions to be scanned by the sensor unit 2. Definition of the portions may be based on the determined motion or movement of the target 4.

Typical sensor units according to the prior art either have a rectangular field of view or are used for scanning a rectangular field of view as is shown in FIG. 5A. When such scanner/method is applied to scan an arbitrary object, much of the information generated by the sensor unit is useless since it does not relate to the target. In the second embodiment, the sensor unit 2 is controlled by the processing and control unit 3 to substantially scan only the target as is shown in FIG. 5B. Thus, the scanning is adapted to the location and/or the shape of the target. Doing so, the scanning process can be sped up, especially in case the sensor unit 2 is of a kind that scans pixel after pixel. Thus, for example, a frame rate of successive images of a target can be increased or more objects can be scanned in the same amount of time.

A further advantage of defining the portions to be scanned based on the image information is that it is possible to scan the regions of the target 4 which have not been scanned yet or which have to be rescanned for any purpose even when the target 4 is moving. An example of this is depicted in FIG. 5C. A first region 11 is scanned in a first scanning step during a first scanning time, a second region 12 is scanned in a second scanning step during a second scanning time and a third region is scanned in a third scanning step during a third scanning time. At each scanning time, the target 4 is at a different location. The scanning of a target in different scanning steps is for example advantageous when a part of the target is covered so that it can not be scanned completely. In this case, in a first step, the uncovered part is scanned and, when the covered part or a sub part of the covered part becomes accessible, the covered part or the sub part is scanned in a second step. Also, scanning may be scheduled according to urgency or importance. For example, when the scanning of a first target is more important than the scanning of a second target, the scanning of the second target may be intermitted in order to scan the first target before returning to the second target.

It is noted however that the scanning that is performed within each of the (first to third) regions need not be simultaneous. For example, each pixel might be scanned at a different time. As another example, lines (e.g. horizontal lines or vertical lines) might be scanned successively and within each line pixel is scanned after pixel. Or, as still another example, all pixels within a line (e.g. horizontal line or vertical line) might be scanned at the same time and the different lines are scanned at different times. It is again noted that the target 4 may be allowed to move at any time.

It seems appropriate to note at this place that the image information parts based on which the sensor image is constructed may correspond to single pixels, to lines of pixels, or any other arrangement of pixels. The regions 11, 12, 13 may—but need not—correspond to such arrangements of pixels forming image information parts. The lines (e.g. horizontal lines or vertical lines) within each region 11, 12, 13 may—but need not—correspond to such lines of pixels forming image information parts.

The processing and control unit 3 comprises a memory (not shown) for storing information indicating which portions of the target 4 have already been scanned. The memory may eventually also store other data required for the operation of the imaging system. In case still images—and not video images—are generated, a portion of the target 4 is normally scanned only once. Based on the stored information indicating which portions of the target 4 have already been scanned, portions which have not been scanned are determined for portions to be scanned.

Further, a distance sensor 9 and an other sensor unit 10 is provided. Distance information determined with the distance sensor 9 may correspond to a distance of the target 4 or a currently scanned area (e.g. pixel, line of pixels) of the target 4 to the sensor unit 2 and/or to a distance of the target 4 or a currently scanned area (e.g. pixel, line of pixels) of the target 4 to the sensor unit 10. The relevant distance is the travel distance of radiation emanated by the target and sensed by the sensor unit 2 and the sensor unit 10, respectively. The determined distance information is used to determine the location of a currently scanned area and/or to determine a resolution of sensor information generated by the sensor unit 2 and/or the sensor unit 10. FIG. 6 shows the dependency of the size of a sensor spot 15 (size of a pixel 15) on the distance to the sensor unit exhibited by some sensor types (e.g. frequency sweeping line sensor). When distance is small, the spot is small (see FIG. 6, top). When the distance is large, the size is large (see FIG. 6, bottom). At least for some sensor types (e.g. a frequency sweeping line sensor), resolution decreases with distance and decreases with spot size. The processing and control section 3 stores which area of the target 4 has been scanned with which resolution in its memory.

Thus, when the target 4 is far, first a "raw scanning" with a low resolution may be applied. When the target 4 comes nearer, the target or "interesting" areas of the target may be rescanned with a higher resolution. The sensor image generated may have regions with different resolution.

The other sensor unit 10 employs a different sensing technique than the sensor unit 2. For example, the sensor units 2, 10 differ in that they operate in another frequency range and/or in that one is an active sensing unit and the other is a passive sensing unit. As described above, the processing and control section 3 may perform an object detection based on the sensor image. When it is found by the processing and control section 3 that it can not be decided whether or not a specific object is present in a specific region, the processing and control section 3 controls the other sensor unit 10 to scan the specific region and generate corresponding information, so that—hopefully—, it can be decided based on the additional information whether or not a specific object is present.

In one embodiment, the sensor unit 2 is a passive microwave, millimeter wave and/or Terahertz sensor and the other sensor unit 10 is an active sensor (e.g. microwave, millimeter wave and/or Terahertz sensor, X-ray sensor). Thus, for example, the sensor unit 2 can not "see through" a wet coat so that it can not be determined if a weapon or other object is under the coat. The other sensor unit 10 may see through the wet coat so that the presence or absence of an object can be detected and a manual investigation is avoided. Both sensors 2, 10 might for example operate within in the 10 GHz to 100 GHz range. A combination of a passive sensor 3 with an active sensor 10 has the advantage that a human target 4 is exposed to radiation only when required and only where required so that an exposure of the human 4 to radiation is reduced. Other sensor types and/or combinations are possible however. For example, the sensor unit 2 may also be an active sensor and the other sensor unit 10 may be an IR sensor.

The distance sensor 9 may be realized by a separate sensor like e.g. a laser and/or infrared distance sensor, an ultrasonic distance sensor or other wave or radiation based distance sensors. The distance sensor 9 may however also be realized as part of the camera 1, the sensor unit 2, the sensor unit 10 and/or the processing and controlling section 3. For example, the distance might be given by or derived from autofocus information of the camera 1, or the camera 1 might produce stereoscopic image information from which the distance might be derived. To provide for reliable distance information, the camera 1 is advantageously calibrated against the environment (must be fixed). Also, it is possible to determine the distance based on the reflected signal originally transmitted by an active sensor (e.g. by the sensor unit 2 or 10). Such determination may, for example, be based on the phase or delay of the reflected signal.

The sensor unit 2 might, for example, comprise a line sensor 5 as in the case of the first embodiment. The field of view of the line sensor 5 defines a plane in three dimensional space which is termed the field of view plane. The field of view and the sensor location lies in this plane. In order to provide for a two dimensional field of view, the line sensor 5 is mounted rotatably (at least the antenna 6 is mounted rotatably, the circuit 7 need not be mounted rotatably). The axis of rotation advantageously is parallel to the field of view plane. Therefore, a cylindrical field of view is provided by the sensor unit 2. The line sensor 5 is rotated by an actuator (e.g. motor, step motor) (not shown). The line sensor 5 might be rotated always in one direction (e.g. at constant angular speed). Alternatively, the line sensor 5 might be rotated for a fraction of 360 degrees in one direction and then be rotated in the opposite direction. During the scanning of a line, the line sensor 5 might or might not rotate. In the first case, the line sensor 5 might e.g. rotate at constant angular speed. In the latter case, the line sensor 5 is stepped from line to line. Instead of rotating the line sensor 5, it is possible to rotate a mirror (not shown) towards which the field of view of the line sensor 5 is directed. The mirror's axis of rotation too is advantageously parallel to the field of view. Thus, a two dimensional field of view is provided by a combination of an electrical movement/scanning (e.g. frequency sweeping) with a mechanical movement (rotation). Such sensor unit 2 combining electrical with mechanical antenna beam steering/selection provides a good scanning speed at a competitive pricing compared to prior art sensor units with a two dimensional field of view. It is noted however that, according to the present invention, it is generally possible to deploy a fully mechanical or fully electrical antenna beam steering/selection.

Optionally, the sensor unit 2 (or at least a radiation reception and/or a radiation emission part thereof) is pivotally mounted in one, two or three dimensions, which allows to pan or swivel the sensor unit 2 (or at least a radiation reception and/or a radiation emission part thereof) in one, two or three dimensions (e.g. pan left/right, pan up/down, rotate clockwise/anticlockwise). Such is for example advantageous, when targets 4 may occur in a very wide area. One or more actuators (not shown) controlled by the processing and control section 3 are provided for effecting the movement of the sensor unit 2 (or at least a radiation reception and/or a radiation emission part thereof).

When the camera 1, the sensor unit 2, the distance sensor 9 and the other sensor 10 are located close together, processing and control is facilitated due to the fact that all these units see the target from approximately the same location (i.e. the units see approximately the same aspect).

Embodiments of the multi aspect imaging system according to the present invention will now be described. The multi aspect imaging system according to the present invention comprises a microwave, millimeter wave and/or Terahertz sensor section and uses one or more reflective elements to obtain a multi aspect scan (e.g. two sided scan, full scan, surround scan) of a target 4. By properly arranging the reflective element(s), it is for example possible to see the front side (as seen from the sensor section) and the backside (as seen from a sensor section) of a target and to detect contraband objects reliably. Due to the reflective elements, neither the sensor section nor the target 4 is required to move, turn or rotate, in order to see the target 4 from different perspectives. The sensor section generates image information portions corresponding to the different aspects or perspectives of the target 4. One image information portion per aspect/perspective is generated. The multi aspect imaging system according to the present invention may, but need not, make use of the multi sensor techniques described above.

As in shown in FIG. 6, a first embodiment of the multi aspect imaging system comprises a sensor section 15, a processing and control unit 3 and a reflective element 16. The processing and control section 3 provides the functionality as described above. The sensor section 15 comprises at least the sensor unit 2 as described above, whereby the sensor unit 2 is adapted to operate in the microwave, millimeter wave and/or Terahertz wavelength/frequency range. The sensor section 15 may further comprise the camera 2, the distance sensor 9 and/or the further sensor unit 10 as described above.

The reflective element 16 may be made from any material or combinations of materials adapted to reflect electromagnetic radiation in the wavelength/frequency range of operation. The reflective element 16 may e.g. be a mirror and/or made from metal (e.g. a metal plate, a metal surface, a polished metal plate, polished metal surface) or made from a meta material. The reflective element 16 may have a flat reflecting surface or may have a curved reflecting surface.

The reflective element 16 is arranged such that the sensor unit 2 (and, eventually, the camera 2, the distance sensor 9 and/or the other sensor unit 10) can view (scan) a second aspect of the target 4 via the reflective element while viewing (scanning) a first aspect of the target 4 directly (i.e. without the reflective element 16). Thus, electromagnetic radiation emitted or reflected by the target 4 is reflected by the reflective element towards the sensor section 15. In case the sensor section 15 comprises an active sensor (e.g. the sensor unit 2 or the sensor unit 10) electromagnetic radiation emitted by the active sensor is reflected by the reflective element 16 towards the target 4. Two images of the target 4 corresponding to the two aspects of the target 4 are generated by the sensor unit 2 or by the sensor unit 2 in combination with the processing and control section 3. The image information portions generated by the sensor unit 2 might directly represent the images of the target 4 or the processing and control section 3 might generate the images based on the image information portions.

The different aspects of the target may be scanned successively, simultaneously or quasi simultaneously (rapid switching between scanning of the first and second aspects). The optional other sensor unit 10 and camera 1 might operate similarly also generating image information corresponding to the two aspects of the target 4.

A curved reflection surface of the reflective element 16 may for example be employed to obtain the effect that the target 4 is seen with the same size even when the travelling distance of radiation is different for the aspect seen directly and the aspect seen in the reflective element 16.

In the embodiment depicted in FIG. 6, one aspect corresponds to the human 4 being seen roughly from the front and one aspect corresponds to the human 4 being seen roughly from the back. Therefore, a full scan of the target 4 is obtained. Through the use of a reflective element 16 only one sensor section 15 is required. The use of additional sensor sections or actuators moving a sensor section around a target is omitted and a very favorably prized solution for obtaining a multi aspect scan of a target 4 is provided.

The reflective element 16 may for example be fixed at a ceiling. The reflective element 16 and or the sensor section 15 (at least the sensor unit 2 and/or the sensor unit 10) may be hidden under or behind a material that is transparent to the radiation in the frequency range of operation. Paper and wood for example are materials sufficiently transparent to microwaves, millimeter waves and Terahertz waves. As already described above in relation to the camera assisted sensor imaging system, the camera 1, the sensor unit 2, the distance sensor 9, and/or the other sensor unit 10 might or might not be located close together. Instead of only one camera 1 and/or distance sensor 9, two cameras 1 and/or two distance sensors 9 may be provided (each corresponding to a different aspect). That is, while the sensor unit 2 views one aspect via the mirror element 16 and one aspect directly, a first camera 1 (distance sensor 9) is provided seeing the first aspect directly and a second camera 1 (distance sensor 9) is provided seeing the second aspect directly.

Figure 7:
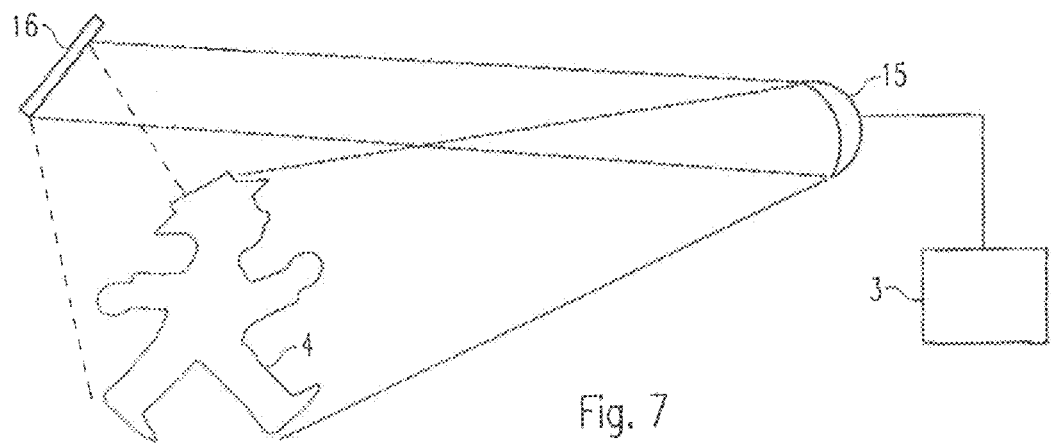
FIG. 7 shows a schematic view of a first embodiment of the multi aspect imaging system according to the present invention.
Figure 8:
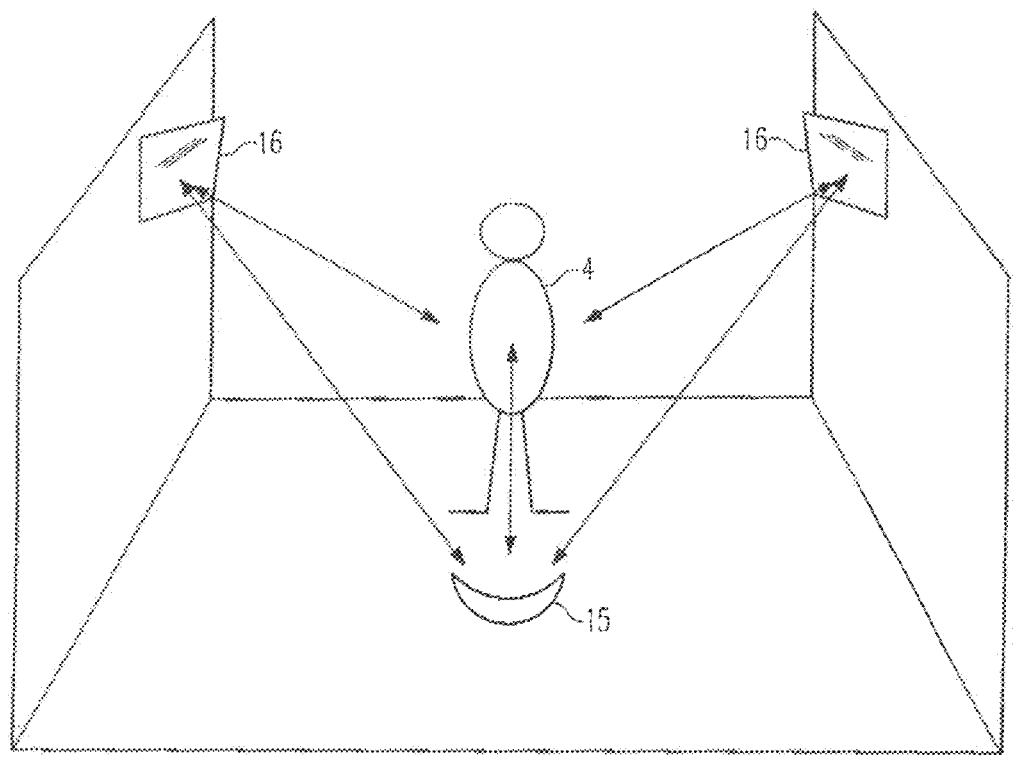
FIG. 8 shows a schematic view of a second embodiment of the multi aspect imaging system according to the present invention.

FIG. 7 shows another embodiment of the multi aspect imaging system according to the present invention. Despite the provision of a further reflective element 16 and a different arrangement of reflective elements 16 and sensor section 15, the embodiment is essentially the same as the first embodiment of the multi aspect imaging system. For the purpose of clarity, the processing and control section 3 is not depicted. In this embodiment, the sensor section 15 sees three aspects of the target 4. A first aspect (e.g. front of human 4) is seen directly, a second aspect (e.g. left back of human 4) is seen via a first reflective element 16 and a third aspect (e.g. right back of human 4) is seen via a second reflective element 16 and corresponding three images are generated. The first and second reflective elements 16 may, for example, be fixed at opposing walls of a corridor as depicted in FIG. 7.

More aspects of a target 4 are obtainable by using more reflective elements 16. The sensor section 15 is not required to view one aspect of the target directly; it may see all aspects via a reflective element 16.

With the multi aspect imaging system is possible to obtain a multi aspect scan in real time and in a normal environment (i.e. without requiring the target 4 to move to a spatial location and, eventually, stop and/or turn around itself there) which is not possible with the prior art technique.

The above embodiments of the camera assisted sensor imaging system and the multi aspect imaging system may be used to provide still images or sequences of images (video information, video images) of the target 4.

The invention claimed is:

1. A camera assisted sensor imaging system comprising:
   an optical and/or infrared camera unit for generating camera image information,
   a processing and control unit configured to detect targets from the generated camera image information, and
   a sensor unit configured to successively scan portions of a detected target and to generate a plurality of corresponding image information parts, wherein
   the sensor unit is operable in the microwave, millimeter wave and/or Terahertz frequency range, and
   the processing and control unit is further configured to construct a sensor image of the target from the image information parts and from the generated camera image information, wherein radiation intensity information of the sensor image is derived from the image information parts and location and/or orientation information of the image information parts in relation to each other is at least partly derived from the generated camera image information.

2. The camera assisted sensor imaging system according to claim 1, wherein the processing and control unit is adapted to define the portions of the detected target by use of the generated camera image information and to control the sensor unit to successively scan the defined portions.

3. The camera assisted sensor imaging system according to claim 2 further comprising:
   a memory for storing information indicating which portion of the target have been scanned, whereby the definition of the portions is made by use of the stored information.

4. The camera assisted sensor imaging system according to claim 1, wherein the processing and control unit is configured to determine a motion or movement of the target and wherein the controlling of the sensor unit and/or the construction of the sensor image is made by use of the determined motion or movement.

5. The camera assisted sensor imaging system according to claim 1, wherein the sensor unit comprises a line sensor configured to scan a one dimensional field of view and generate a corresponding portion of line image information.

6. The camera assisted sensor imaging system according to claim 5, wherein the line sensor provides a plurality of electronically selectable antenna beam directions from which the one dimensional field of view is constructed.

7. The camera assisted sensor imaging system according to claim 5, wherein the line sensor or a mirror covering the field of view of the line sensor is rotatably mounted in the sensor unit so that a two dimensional field of view is provided by the sensor unit.

8. The camera assisted sensor imaging system according to claim 1, wherein the construction of the sensor image comprises arranging the image information parts or data derived therefrom in two dimensions based on the location and/or orientation information derived from the generated camera image information.

9. The camera assisted sensor imaging system according to claim 1, wherein the sensor image corresponds to electromagnetic radiation emitted or reflected by the target and received by the sensor unit.

10. The camera assisted sensor imaging system according to claim 1, wherein the processing and control unit is configured to determine one or more distances to the target, wherein the construction of the sensor image makes use of the determined distances.

11. The camera assisted sensor imaging system according to claim 1, wherein the processing and control unit is configured to control the sensor unit so as to rescan a portion of a detected target in case the target comes closer to the sensor unit and/or to obtain an improved image of the portion.

12. The camera assisted sensor imaging system according to claim 11, wherein the rescan is performed with the same resolution.

13. The camera assisted sensor imaging system according to claim 11, wherein the rescan is performed with a higher resolution.

14. The camera assisted sensor imaging system according to claim 1, further comprising:
   one or more reflective elements, whereby the sensor unit is configured to successively scan second portions of the detected target and to generate a plurality of corresponding second image information parts, the sensor unit is configured to scan the second portions via a reflective element and to scan first portions directly or via another reflective element, the first image information parts corresponding to a first aspect of the target, the second image information parts corresponding to a second aspect of the target, wherein
   either the construction of the sensor image is further made from the second image information parts,
   or the processing and control section is adapted to construct a second image of the target from the second image information parts and the generated image information.

* * * * *